March 20, 1928.
R. V. PROCTOR
METHOD OF MAKING SHEET METAL ARTICLES
Filed July 16, 1924   2 Sheets-Sheet 1
1,663,316
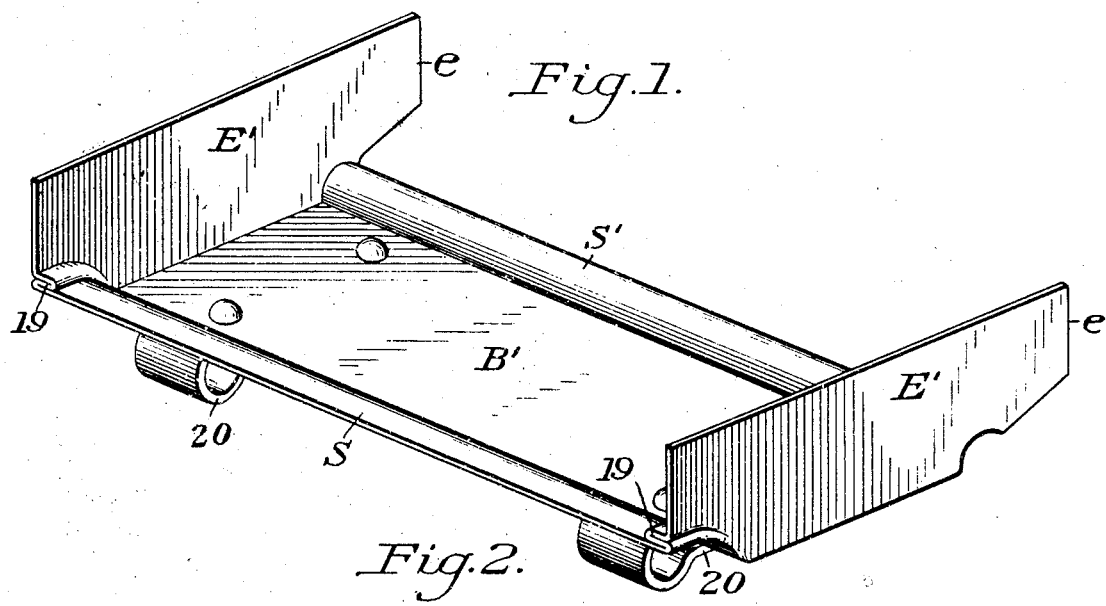
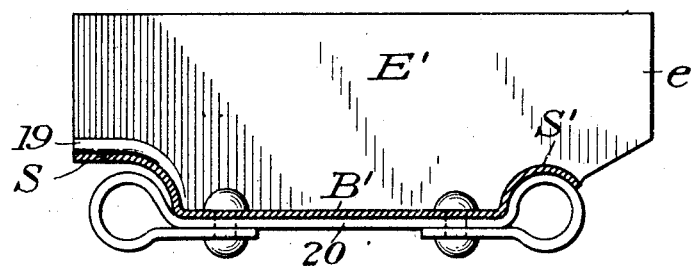
INVENTOR March 20, 1928.  1,663,316
R. V. PROCTOR
METHOD OF MAKING SHEET METAL ARTICLES
Filed July 16, 1924.   2 Sheets-Sheet 2

INVENTOR
Robert V. Proctor,

Patented Mar. 20, 1928.

1,663,316

UNITED STATES PATENT OFFICE.

ROBERT V. PROCTOR, OF YOUNGSTOWN, OHIO, ASSIGNOR TO THE COMMERCIAL SHEARING AND STAMPING COMPANY, OF YOUNGSTOWN, OHIO, A CORPORATION OF OHIO.

METHOD OF MAKING SHEET-METAL ARTICLES.

Application filed July 16, 1924. Serial No. 726,315.

The present invention relates broadly to sheet metal work, and more particularly to conveyor pans of the character used in conveying bulk material such as coal, and to the method of making the same.

It has heretofore been customary in the art to which the present invention relates, to make conveyor pans of the particular type herein contemplated, by punching and cutting a sheet of metal, thereafter bending it to shape, and then welding the meeting edges, or by welding together a plurality of separate pieces. These pans, while generally satisfactory in use, have been relatively expensive by reason of the separate welding steps required.

In accordance with the present invention the objections referred to are obviated and I am enabled to provide a one piece pan entirely free from welds, thereby not only insuring greater strength, or at least uniformity of strength, but also an increased production at a correspondingly decreased cost. These advantages are obtained by the shape of the blank utilized, by the construction of the dies employed for the shaping operation, and by the control of the flow of the metal during the shaping of the blank.

In the accompanying drawings there is shown for purposes of illustration only one method of carrying out the present invention, it being understood that the drawings do not define the limits of my invention as changes may be made in the construction and operation disclosed therein without departing from the spirit of the invention or scope of my broader claims.

In the drawings—

Figure 1 is a perspective view of a completed pan constructed in accordance with the present invention;

Figure 2 is a transverse sectional view through the pan shown in Figure 1;

Figure 3 is a plan view of a blank suitable for producing a pan as herein disclosed;

Figure 4:
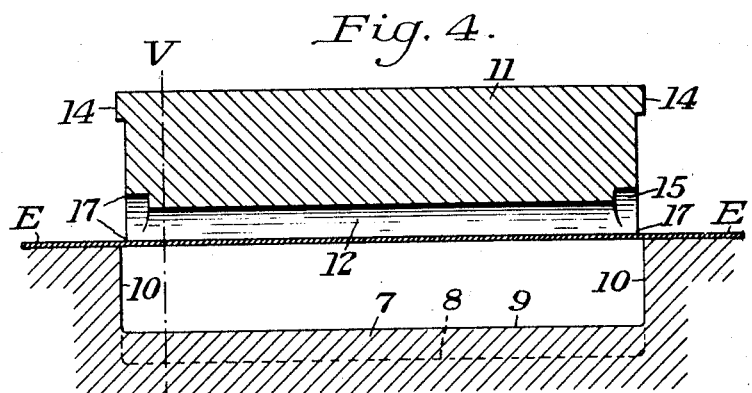
Figure 4 is a longitudinal sectional view through a pair of dies for forming the blank, the blank being shown in position on the female die.
Figure 5:
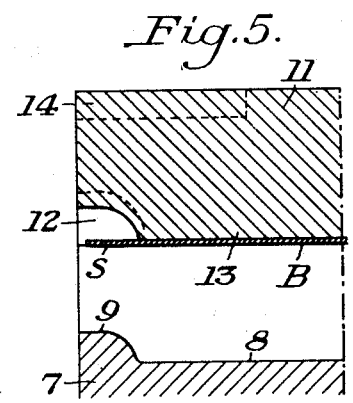
Figure 6:
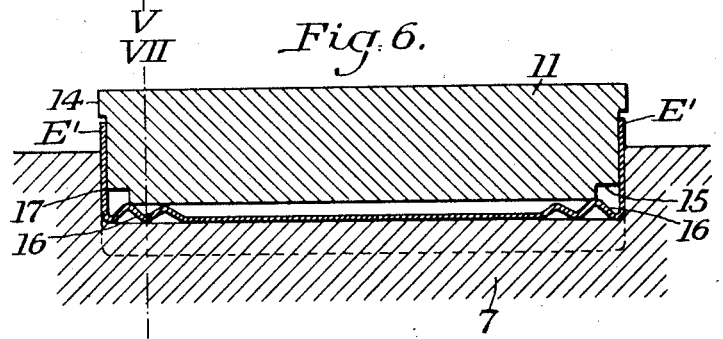
Figure 7:
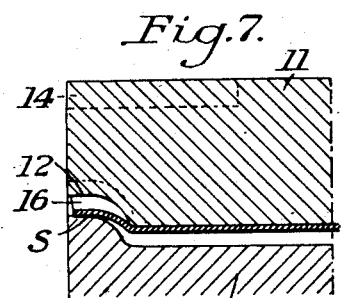
Figure 8:
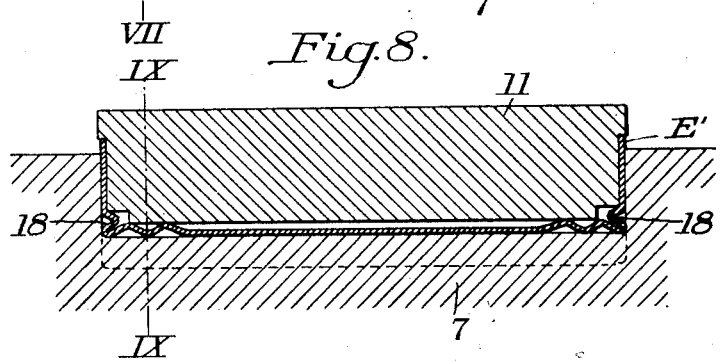
Figure 9:
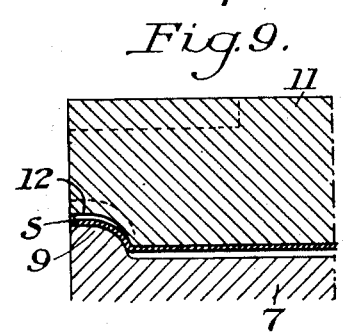

Figure 5 is a transverse sectional view through a portion of the dies, the section being taken on the line V—V of Figure 4;

Figures 6 and 7 are views corresponding respectively to Figures 4 and 5, but illustrating the dies at an intermediate stage during the formation of the pan;

Figures 8 and 9 are views corresponding respectively to Figures 6 and 7, but illustrating still another stage in the production of the pan, and

Figure 10:
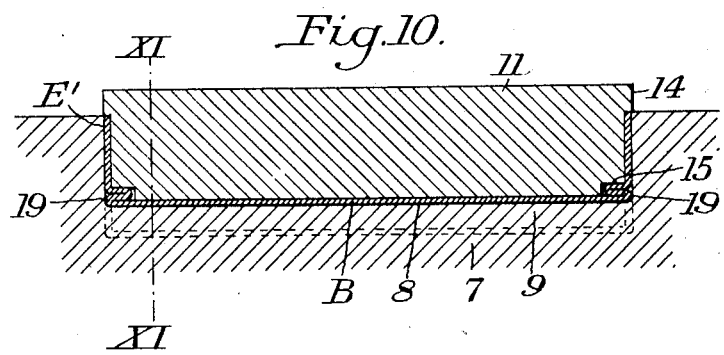
Figure 11:
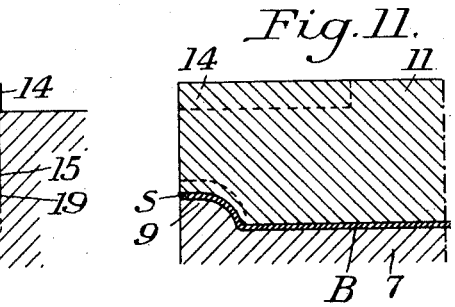

Figures 10 and 11 are views corresponding to Figures 8 and 9 illustrating the dies in their final forming position.

I have found that by properly shaping the dies utilized in the production of a conveyor pan of the character herein disclosed, it is possible to first produce a series of vertical corrugations in certain portions of the blank, and thereafter cause these corrugations to travel endwise and thereby form horizontally extending super-imposed folds. These folds represent the excess metal which heretofore has been removed by splitting or cutting the blank, thereby necessitating a welding operation.

In Figure 3 there is illustrated one form of blank suitable for producing the pan illustrated in Figures 1 and 2. In this figure there is illustrated a central bottom portion B adapted to form the bottom B' of the conveyor pan and end portions E adapted to form the ends E' of the finished pan. Along each edge of the blank there are side portions $s$ and $s'$ adapted to form the upwardly curved edges S and S' respectively of the finished pan. The lines on which the blank is folded in producing the parts referred to are indicated by chain lines in Figure 3.

It will be noted that the blank is illustrated as having certain portions thereof adjacent each of the corners 2 and 3 cut away. In Figure 3 I have shown arrows 4 adapted to indicate the direction of flow of the metal during the formation of the pan whereby these corners are filled out to produce the completed pan having substantially straight side edges. On the opposite side of the blank there are reentrant portions 5. These reentrant portions not only insure the production of overhanging or projecting portions $e$ in the completed pan, but also permit the metal to flow laterally as indicated by the arrows 6.

After the blank has been cut, it is laid across a female die 7 as shown in Figures 4 and 5 having a depressed central portion 8 and upwardly curved side edges 9 enclosed within vertically extending ends 10. This blank is then engaged by male die 11 having its side edges formed with grooves 12 adapted to cooperate with the upwardly curved side edges 9 and with a central portion 13 adapted to enter the depression 8 and form the bottom B of the pan. The die 11 is preferably provided on each end thereof throughout a portion of its width with a shoulder 14 adapted to engage the ends E' of the pan and prevent any tendency of the metal to flow upwardly adjacent the side edge S. The male die is also preferably formed with cut away corners 15 adapted to accommodate the surplus metal as will be hereinafter more fully apparent.

It will be understood that the conveyor pans produced by the present invention are adapted to be used in accordance with the usual practice, with the projecting portions e of one pan extending outside of the end flanges E' of the pan on one side thereof, and with the side edge S overlapping the side edge S' of a pan on the other side. In view of this cooperation, it is unnecessary to have the edge S' either as deep or as wide as the edge S, and comparatively little difficulty is encountered in the formation thereof with a blank of proper shape and with dies tending to prevent any undesirable flow of the metal. Due, however, to the dimensions through the side edge S as compared with the dimensions through the longitudinal center of the pan, a considerable problem is involved in the making of this edge. I have found that best results can be accomplished by first confining the blank in such manner as to produce a plurality of vertically extending corrugations and thereafter acting upon the blank to first cause these corrugations to travel endwise and decrease in size and to thereafter form super-imposed folds which are pressed into position. Figures 4 to 11 of the drawings deal more particularly with the portions of the dies having to do with the formation of edge S. It will be apparent, however, that if it is desired for any reason to increase the dimensions of the edge S', the two sides of the dies may be correspondingly shaped and the metal on both edges of the blank uniformly acted upon.

After the parts have been brought into cooperative relation as illustrated in Figures 4 and 5, the male die is lowered causing it to depress the central portion B of the blank and thereby produce the upstanding ends E' which serve as strengthening beams during the continued shaping of the pan. The descent of the male die is continued until the edge portion s of the blank is brought into engagement with the upwardly curved edge 9 of the female die. Thereafter the further descent of the portion s will be checked, while the portion B of the blank will continue downwardly. Due to the fact that the depth of the depression in the female die above the edge 9 is considerably less than that through the central portion, the surplus metal above the edge 9 adjacent the ends of the blank is caused to form a plurality of vertical corrugations 16. As the travel of the die continues, the distance between the bottom of the groove 12 and the top of the edge 9 diminishes, thereby tending to flatten out the corrugations 16. This flattening out causes the corrugations to travel endwise of the blank into the space provided by the notches or recesses 15.

The male die is preferably provided with relatively sharp corners 17 at the ends thereof which corners tend to bite into the metal forming the ends E' and prevent the metal from flowing upwardly past the male die. This tendency is further overcome by providing the die with the shoulders 14 which overlap the end portions E of the blank and cause them to remain of substantially constant width. The width of the end portions E is also such that an effective reinforcing beam is provided of sufficient strength to partially overcome this tendency independently of the shoulders 14. Just before the dies come into the final registration, as illustrated in Figure 8, the end corners buckle inwardly to form corrugations 18, and accommodate the excess metal represented by the vertical corrugations. All of these corrugations are flattened out to form super-imposed folds 19 during the final movement of the dies into the position shown in Figures 10 and 11.

Due to the action of the stiff ends, and the shoulders 14, and the relatively small space provided by the notches 15, a portion of the metal is caused to flow outwardly as indicated by the arrows 4 in Figure 3. This action tends to widen out the pan adjacent the ends so that in the finished pan the edge S is substantially straight as shown in Figure 1.

The beam action exerted by the end portions E during the formation of the pan is sufficient of itself, in combination with the sharp corners on the male die as before referred to, to prevent the metal from flowing upwardly in the ends above the edge S'. The metal being thus confined is caused to flow laterally as indicated by the arrows 6, the surplus metal thus tending to fill out the contour of the pan without the formation of any folds as is involved in the formation of the edge S. In the form of pan illustrated, this is of considerable importance, as it is desirable to have a relatively smooth upper surface on the edge S' against which the under side of the edge S of an adjacent pan may bear.

After the pan has been completed, there may be secured thereto in any desired manner links 20 by means of which the adjacent pans may be secured together and the driving thereof effected. The improved article disclosed herein is claimed in my divisional application, Serial No. 88,828, filed February 17, 1926.

The advantages of the present invention arise from the formation of a conveyor pan from a single piece of metal entirely free from any welds.

Further advantages arise from the method of controlling the flow of the metal during the shaping thereof whereby the surplus metal at certain portions of the blank is formed into folds serving to reinforce the pan without interfering with its operation or cooperation with adjacent pans.

I claim:

1. The method of manufacturing sheet metal articles, comprising forming a blank, placing said blank over a female die having a low central portion and upwardly curved sides, engaging said blank with a male die having its lower end shaped to substantially conform to the first mentioned die, bringing the side edges of the blank into engagement with said curved sides, continuing the descent of the male die to force the central portion of the blank down, gradually compressing the side edges to cause the metal to flow lengthwise to form folds, and then compressing said folds.

2. The method of manufacturing sheet metal articles, comprising forming a blank, holding said blank against elongation in one direction and shaping said blank to cause the metal to flow and form vertically extending corrugations in certain portions thereof, compressing said corrugations to cause the same to form folds, and thereafter compressing said folds.

3. The method of manufacturing sheet metal articles, comprising forming a blank, having certain portions thereof cut away, and thereafter shaping the blank and compressing the same to cause the metal to flow outwardly to fill said cut away portions and impart the desired contour to the pan.

4. In the method of manufacturing sheet metal articles, the steps consisting of bending a blank to form upstanding ends while keeping the sides substantially flat, engaging the edges of said upstanding ends to prevent flow of the metal upwardly, and pressing said sides intermediate the ends out of the plane of the remainder of the body.

5. In the method of manufacturing sheet metal articles, the steps consisting of bending a blank to form upstanding ends while keeping the sides substantially flat, preventing upflow of metal in said ends, and pressing said sides out of the plane of the remainder of the body while preventing such upflow of metal.

6. In the method of manufacturing sheet metal articles, the steps consisting of shaping a blank to form upstanding ends, preventing upflow of metal in said ends while pressing a portion of the body of the blank intermediate the ends out of the plane of the remainder of the body, and producing an endwise flow of metal along the edges of the body during such pressing operation.

7. In the method of manufacturing sheet metal articles, the steps consisting of shaping a blank to form upstanding ends, preventing upflow of metal in said ends while pressing a portion of the body of the blank intermediate the ends out of the plane of the remainder of the body, and producing an endwise flow of metal along the edges of the body during such pressing operation to thereby form corrugations adjacent the upstanding ends.

8. In the method of manufacturing sheet metal articles, the steps consisting of shaping a blank to form upstanding ends, preventing upflow of metal in said ends while pressing a portion of the body of the blank intermediate the ends out of the plane of the remainder of the body, producing an endwise flow of metal along the edges of the body during such pressing operation to thereby form corrugations adjacent the upstanding ends, and thereafter flattening said corrugations.

9. The method of manufacturing sheet metal articles, comprising forming a blank, shaping said blank to form a plurality of corrugations in certain portions thereof, subjecting the corrugations to pressure to cause the same to move laterally and form a major fold, and compressing said fold.

10. The method of manufacturing sheet metal articles comprising forming a blank, shaping the blank to provide two upstanding portions on opposite sides thereof with a plurality of corrugations intermediate said portions, compressing said corrugations to effect movement thereof toward said portions to form a fold, and compressing said fold.

11. The method of manufacturing sheet metal articles comprising forming a blank, shaping said blank to produce a plurality of corrugations, subjecting said corrugations to pressure to cause the metal therein to flow into one fold and compressing said fold.

In testimony whereof I have hereunto set my hand.

ROBERT V. PROCTOR.